United States Patent
Bloom et al.

[11] 3,883,555
[45] May 13, 1975

[54] INTERMEDIATES FOR DIPYRRYLMETHENE DYES

[75] Inventors: Stanley M. Bloom, Waban; Paulina P. Garcia, Arlington, both of Mass.

[73] Assignee: Polaroid Corporation, Cambridge, Mass.

[22] Filed: May 5, 1972

[21] Appl. No.: 250,596

Related U.S. Application Data

[62] Division of Ser. No. 723,474, April 23, 1968, Pat. No. 3,691,161.

[52] U.S. Cl. .... 260/326.5 J; 260/240.1; 260/240.7; 260/376.5 M; 260/313.1; 260/326.9; 260/295 AM; 260/296 R; 96/92; 96/93

[51] Int. Cl. .............................. C07d 27/26
[58] Field of Search ... 260/326.5 M, 326.3, 326.5 J, 260/313.1

[56] References Cited
UNITED STATES PATENTS
3,285,931  11/1966  Huisgen .................. 260/313.1

Primary Examiner—Joseph A. Narcavage
Attorney, Agent, or Firm—John P. Morley

[57] ABSTRACT

Novel Dipyrrylmethene dyes, particularly 5 and/or 5'-o-dihydroxyphenyl dipyrrylmethene dyes, and 1:1 metal complexes thereof.

4 Claims, 1 Drawing Figure

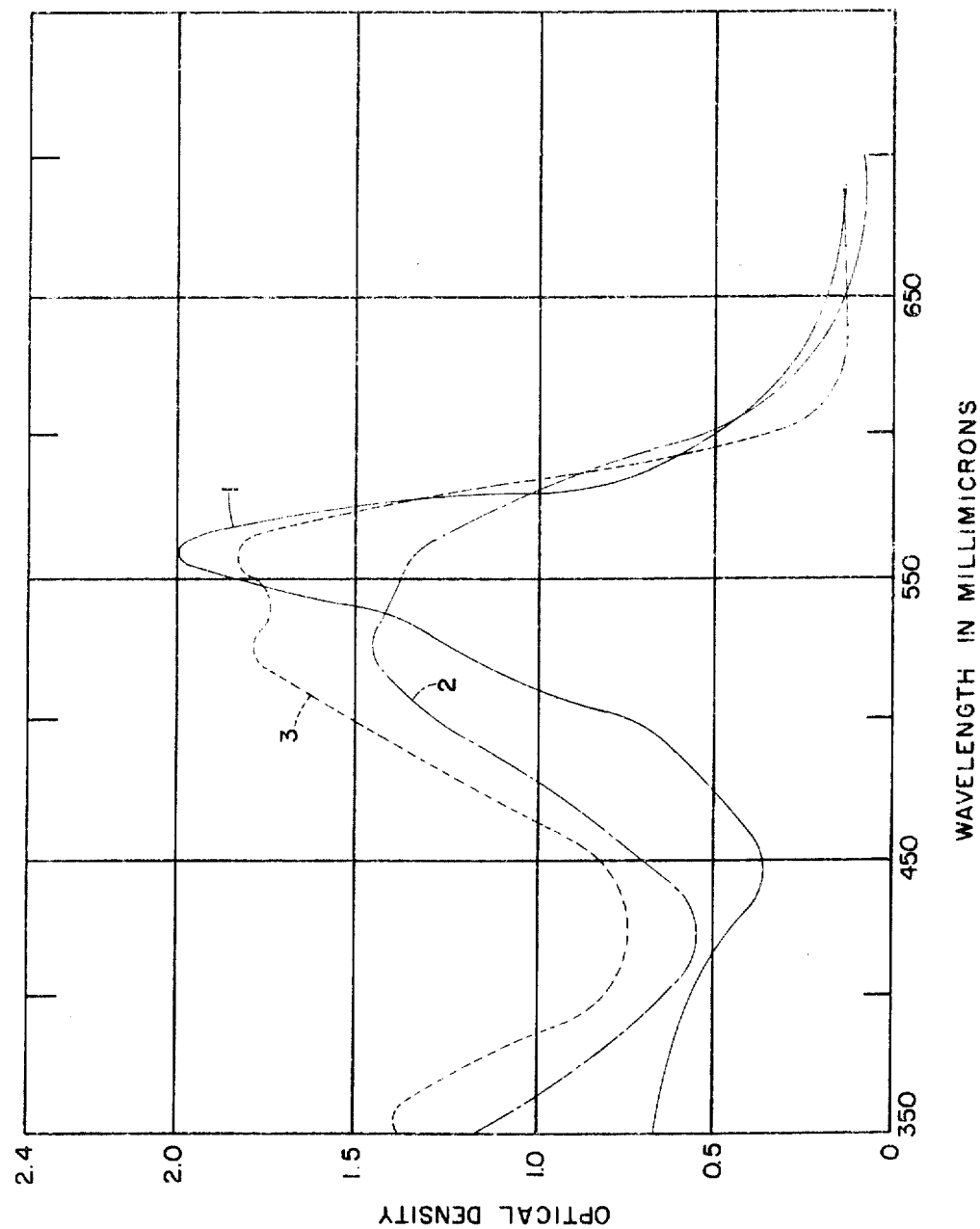

INTERMEDIATES FOR DIPYRRYLMETHENE DYES

CROSS REFERENCE TO RELATED APPLICATIONS

This application is a division of U.S. Pat. Application Ser. No. 723,474 filed April 23, 1968, now U.S. Pat. No. 3,691,161.

BACKGROUND OF THE INVENTION 3,3',5,5'-tetraphenyldipyrrylmethene

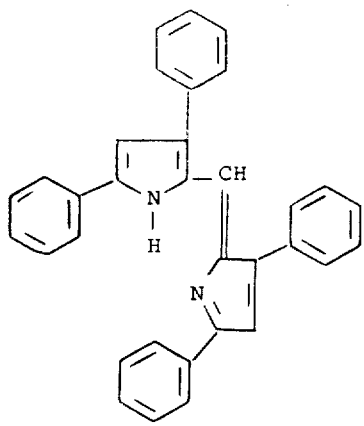

and a copper complex containing two dye molecules to one copper atom has been disclosed in the *Journal of the Chemical Society*, 1943, page 596.

Metal-complexed dyes such as the aforementioned 2:1 complex generally exhibit markedly greater stability against the color degradation effects of actinic radiation, humidity and/or heat than do the non-complexed dyes. However, in certain applications 1:1 complexes are markedly superior to 2:1 complexes. For example, 1:1 complexes exhibit sharper spectral absorption curves with lesser absorption in unwanted regions of the spectrum and hence are of greater value in subtractive color photographic systems directed to providing accurate color reproductions of the subject matter. Moreover, in any uses involving diffusion or transfer of the dye from one element to another, e.g., in diffusion transfer color photographic systems wherein an imagewise distribution of dye is transferred to a dyeable stratum to impart thereto a dye image, the relative mobility of the dye is important and may in fact be critical to practical use of the dye. Obviously, a 2:1 complex (containing two molecules of dye) is considerably more bulky and hence less mobile than a 1:1 complex.

The present invention is, therefore, directed to novel dipyrrylmethene dyes which may be employed to obtain 1:1 metal complexes, unlike the previously disclosed tetraphenyldipyrrylmethene, and to 1:1 metal complexes obtained therefrom. Simply stated, the present invention is directed to novel analogues of the previously disclosed 3,3'-5,5'-tetraphenyldipyrrylmethene, which analogues will provide 1:1 complexes as distinguished from the previously disclosed dye which will only provide 2:1 complexes.

SUMMARY OF THE INVENTION

The novel dyes of this invention may be defined as being dipyrrylmethenes containing an o-hydroxyphenyl radical, i.e., o-hydroxyphenyl or an o-hydroxyphenyl radical containing substituents bonded to other nuclear carbon atoms, in at least one of the 5 and 5' positions. The novel metal-complexed dyes of this invention are 1:1 metal complexes of the above-mentioned dyes. The complexes may further include any ligand, preferably a non-chromophoric ligand, if necessary to satisfy the coordination number of the particular metal employed to form the complex, as is common to the art of forming dye complexes generally.

BRIEF DESCRIPTION OF DRAWING

The FIGURE is a graphic illustration comparing the spectrophotometric curve of a typical magenta dye of this invention with two other magenta dyes.

DESCRIPTION OF PREFERRED EMBODIMENT

In the preferred embodiment, the novel 1:1 metal complexes are complexes of a transition metal, e.g., Cr, Mn, Fe, Co, Ni, Cu, Ru, Rd, Pd, Pt, Ag, Ir, Au, etc., although metals other than the transition metals, e.g., Cd, Zn, Mg, etc. are also contemplated.

As was mentioned previously, this invention relates to novel dipyrrylmethene dyes and to 1:1 metal complexes of such dyes.

A primary object of this invention, therefore, is to prepare novel non-complexed dyes of the foregoing description.

Another object is to prepare novel 1:1 metall complexes of such dyes.

Still another object is to provide novel intermediates for use in preparing the novel dyes of this invention.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing.

The novel dipyrrylmethene dyes of this invention containing a 5 and/or 5'-o-hydroxyphenyl radical may be represented structurally by the following formula:

(A)
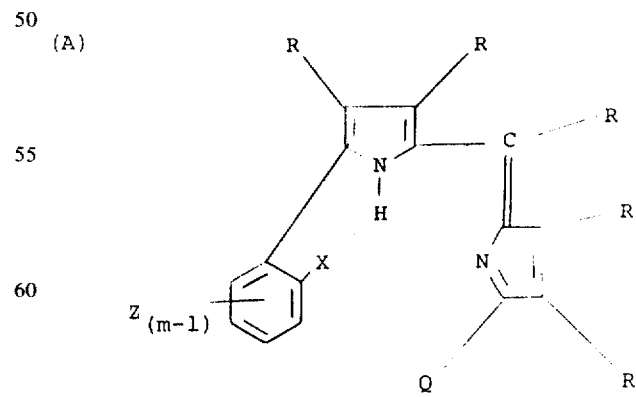

wherein: each R, which may be the same or different, may be alkyl of 1-18 carbon atoms, preferably 1-6 carbon atoms, aryl, e.g., phenyl or naphthyl, substituted aryl, e.g., a phenyl or naphthyl nucleus containing one or more of the following substituents: hydroxy, chloro, methyl, ethyl, methoxy, ethoxy, —COOH, —CONH₂, etc.;

Q may be an alkyl of 1–6 carbon atoms, preferably less than four carbon atoms, i.e., methyl, ethyl, propyl, or isopropyl, and N,N-dimethylaminoalkyl, N,N-diethylaminoalkyl or N-methyl, N-ethylaminoalkyl wherein the alkyl moiety contains 1–6 carbon atoms, preferably less than 4 carbon atoms,

each Z, which may be the same or different, may be hydroxy, chloro, alkoxy, preferably lower alkoxy containing i.e., 1–6 carbon atoms, e.g., methoxy, ethoxy, etc.; alkyl, preferably lower alkyl containing 1–6 carbon atoms, e.g., methyl, etc., carboxy or amido;

m is a positive integer from 1–4, it being understood that where m is 1, each of the carbon atoms of the benzene nucleus is unsubstituted, i.e., contains a hydrogen atom; and X is hydrogen or hydroxy, provided that where Q does not comprise an o-hydroxyphenyl or substituted o-hydroxyphenyl, as heretofore described, X must be hydroxy.

The preferred dyes of formula A are those within the following formula:

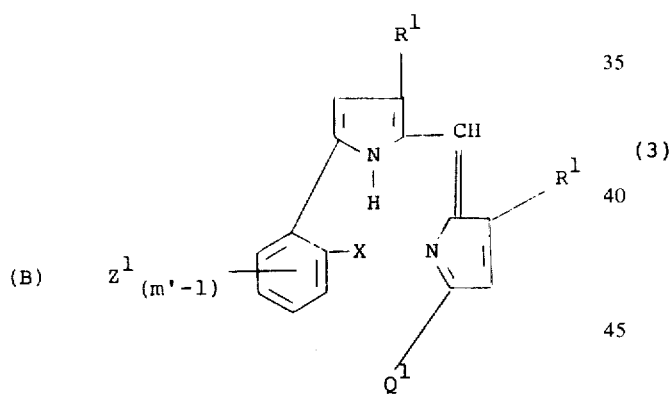

wherein each $R^1$, which may be the same or different, is methyl, ethyl, phenyl or a substituted phenyl of the formula:

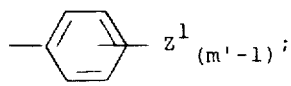

$Q^1$ is methyl, ethyl, phenyl, o-dihydroxyphenyl, and methyl and/or methoxy-substituted phenyl, including those having an o-hydroxy substituent;

each $Z^1$ is hydroxy, methyl or methoxy;

m' is a positive integer from 1 to 3;

and X has the meaning heretofore noted, provided again that where $Q^1$ does not provide an o-dihydroxyphenyl moiety, X must be hydroxy.

As examples of illustrative dyes contemplated by this invention, mention may be made of the following:

(1)

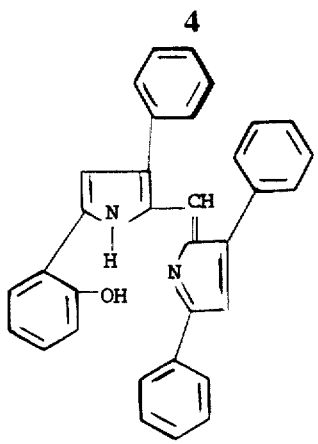

(2)

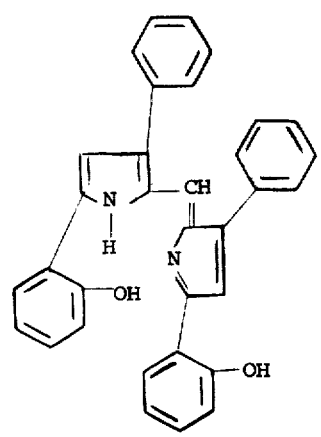

(3)

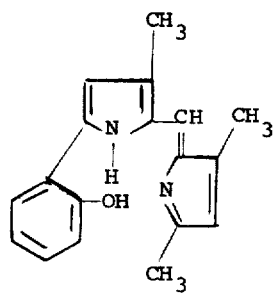

(4)

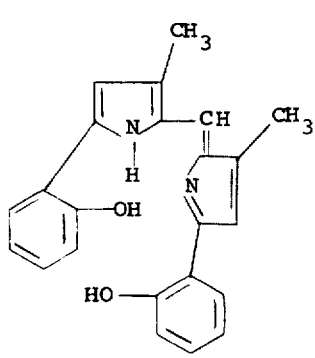

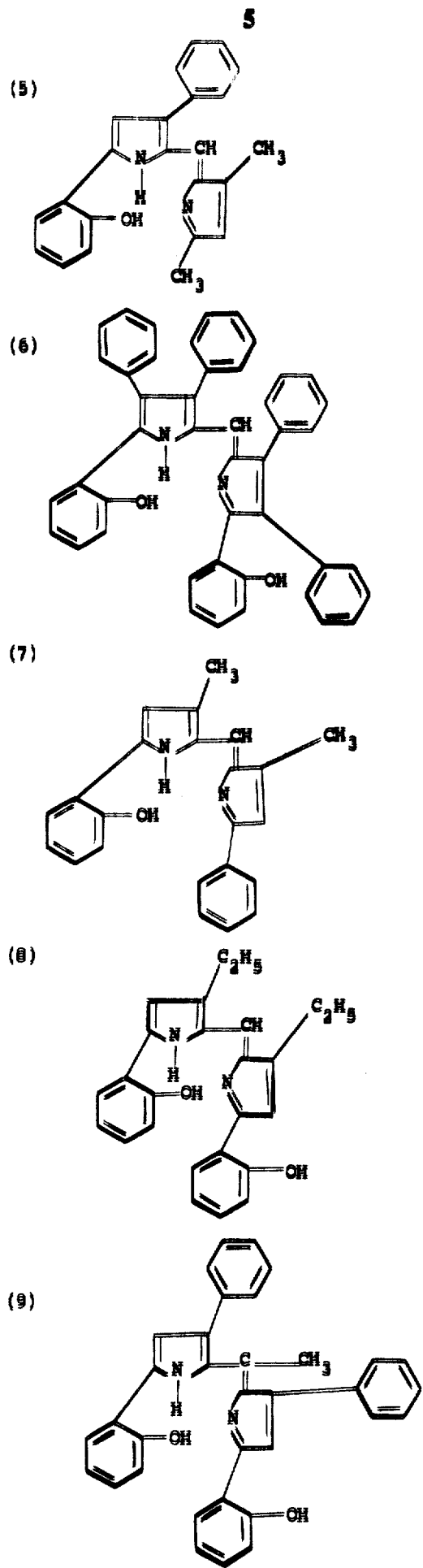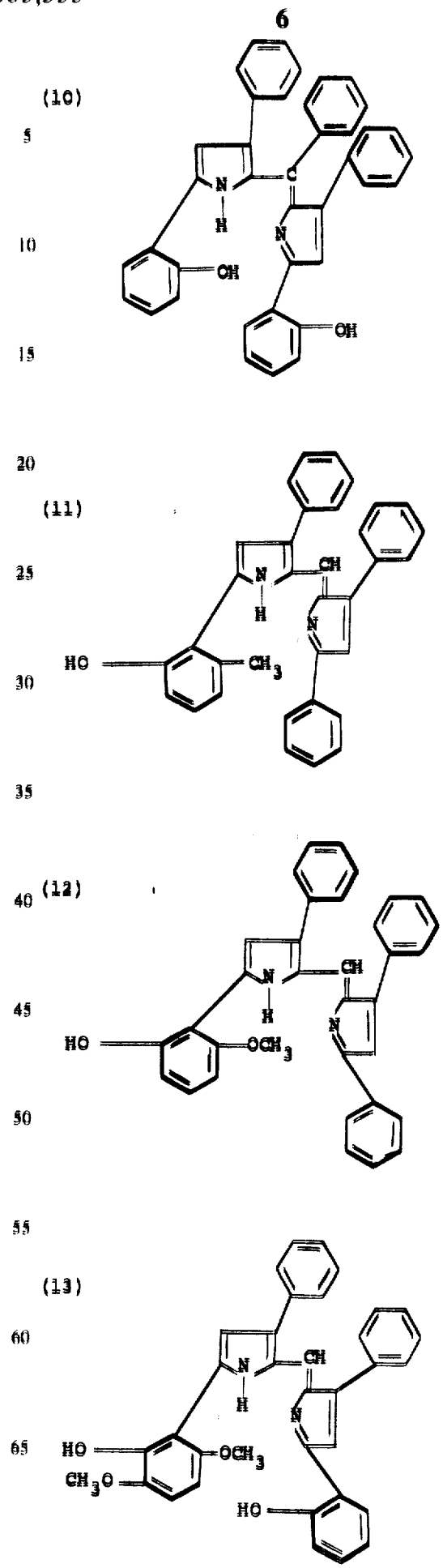

(14) 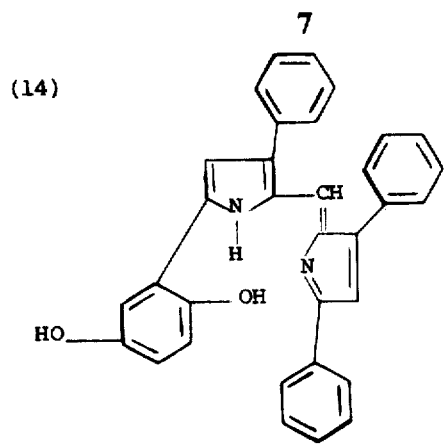
(15) 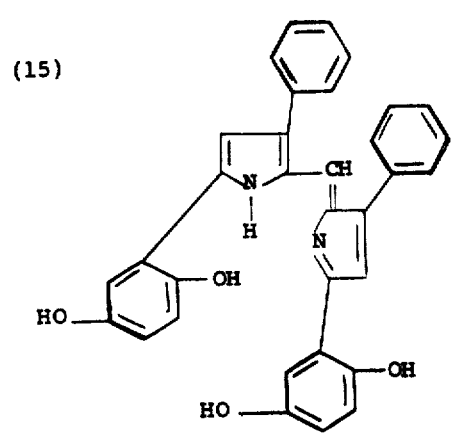
(16) 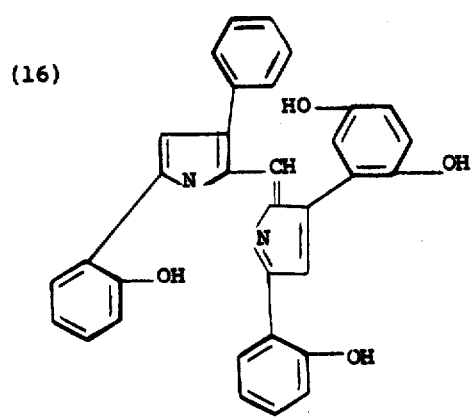
(17) 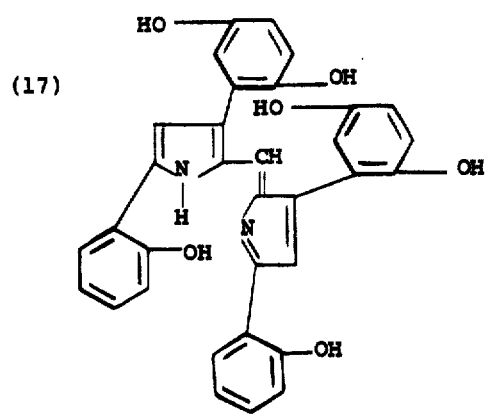
(18) 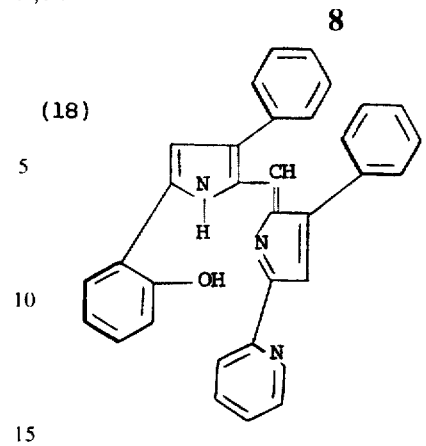
(19) 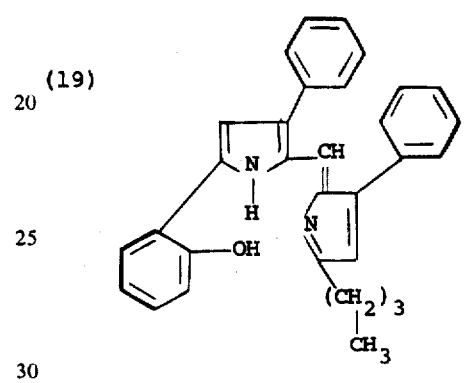
(20) 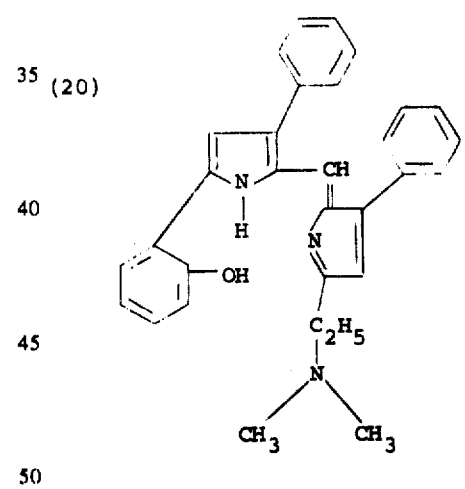
(21) 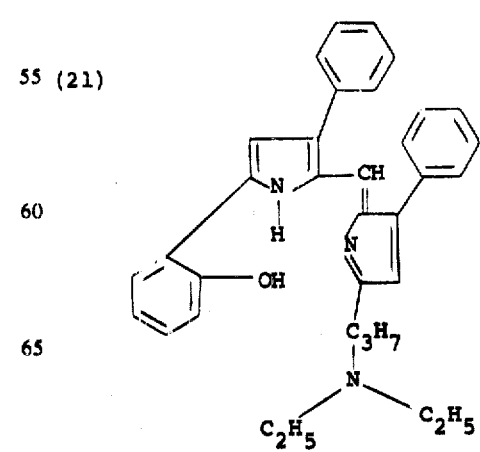

(22) 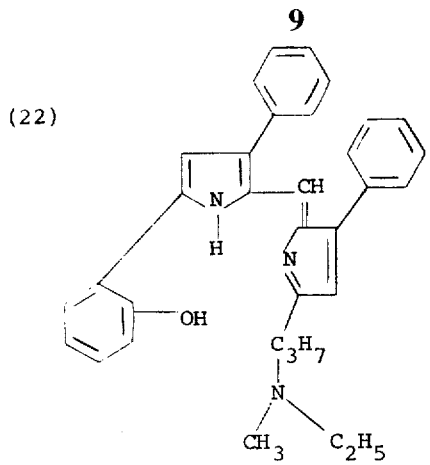

It will be noted that compounds 14 and 15 are dye developers, that is dyes which are also silver halide developing agents, the developing function in this instance being supplied by the p-dihydroxyphenyl moiety. In addition to being capable of being complexed to provide a 1:1 metal complex, the dyes of compounds 14 and 15 are thus of separate utility in the photographic systems for preparing color images described and claimed in U.S. Pat. No. 2,983,606 issued to Howard G. Rogers. In such systems, a photosensitive element comprising one or more light-sensitive silver halide emulsions each having a dye developer associated therewith is exposed and then contacted with an aqueous alkaline processing composition to develop the photosensitive element and as a function of development to provide an imagewise distribution of diffusible dye which is transferred, at least in part, by diffusion, to a superposed dyeable stratum to impart thereto a dye transfer image.

It will be appreciated, however, that if the dye is first complexed, the developing function is effectively removed so that a metal complex of a dye of formulae 14 and 15 may not be employed as a dye developer in such systems.

The dyes of formulae 16 and 17 are also dye developers. However, it will be observed that the developing function is contained on a different portion of the molecule so that a metal complex of these dyes may be employed as a dye developer in the foregoing patented system. The metal complex may be formed prior to color image formation, in which case it is employed in the manner described in the aforementioned patent and in U.S. Pat. No. 3,218,164 issued to Milton Green, et al., or it may be complexed after color image formation to increase the stability against fading of the thus formed color print. In like manner, noncomplexed dye developers such as those of formulae 14 and 15 may be employed to provide color transfer images which can be complexed after image formation. The aftercomplexing of dye transfer images is described, for example, in U.S. Pat. Nos. 3,081,167 and 3,196,014.

The novel dyes of this invention may be made by condensing a pyrrole of the formula:

(C) 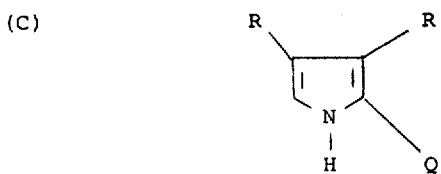

with a 5-formylpyrrole of the formula:

(D) 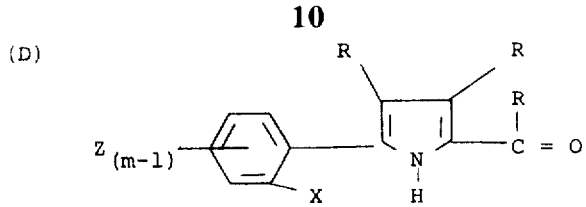

or by condensing a pyrrole of the formula:

(E) 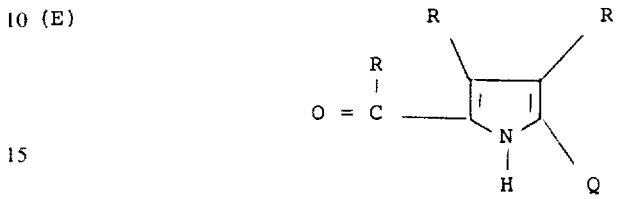

with a pyrrole of the formula:

(F) 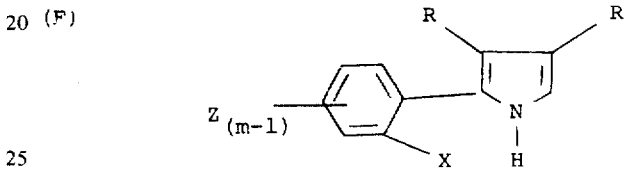

to obtain the desired compound of formula A.

The pyrroles of formula C may in turn be prepared by reacting a compound of the formula:

(G) 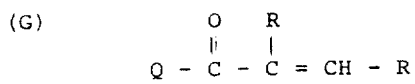

with nitromethane to form a compound of the formula:

(H) 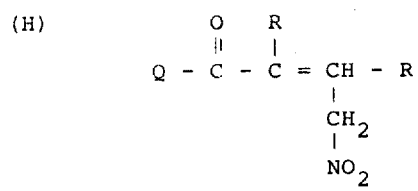

followed by hydrogenation in the presence of a suitable hydrogenation catalyst, e.g., Raney nickel, to effect reduction, ring-closure, and dehydrogenation to form the desired compound of formula C. However, where Q comprises a hydroxyphenyl substituent, the starting compound of formula G preferably employs the protected methoxy analogue, in which event the corresponding methoxyphenyl pyrrole is formed. To obtain the desired hydroxyphenyl compound, i.e., a pyrrole of formula C wherein Q comprises a hydroxyphenyl substituent, the methoxyphenyl analogue is then demethylated by known demethylation techniques, e.g., by reaction with boron tribromide.

The compounds of formula F may be obtained by the same procedure, namely by reacting a vinyl ketone of the formula:

(I) 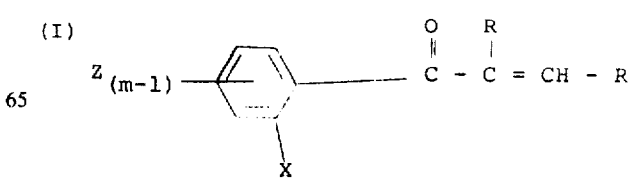

with nitromethane to form a compound of the formula:

(J)

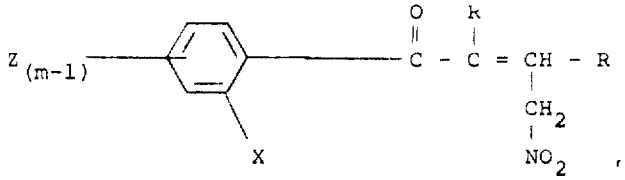

followed by hydrogenation, ring closure and dehydrogenation in the manner described above. Again, where X is intended to be hydroxy, the methoxy analogue is first prepared, followed by demethylation as described above.

The 5-formyl compounds of formula D may be prepared by reaction of a compound of Formula F with dimethylformamide and $POCl_3$. In like manner the 5-formyl compounds of formula E may be prepared by the same reaction of a compound of Formula C.

In the aforementioned reactions, potassium cyanide may be employed in lieu of nitromethane, if desired.

Where the compounds of formula A are symmetrical, i.e., where both pyrrole moieties contain the same substituents, they may be prepared by reacting a compound of formula C or a compound of formula F with formic acid or a derivative:

RCHO to form the desired compound of formula A. They may also be prepared by reacting a compound of formula C with $HC(OC_2H_5)_3$ or an aromatic carboxylic acid, e.g., benzoic acid.

The compounds of formula C and E wherein Q is o-dihydroxyphenyl or a substituted o-dihydroxyphenyl and the compounds of formulae D and F wherein X is hydroxy are themselves novel compounds, as are the methoxy analogues thereof as noted above.

Metal complexes of the novel dyes of this invention may be prepared in the manner common to the art of dye complexing, namely reacting the dye with a metal salt, e.g., an organic salt. This may be accomplished, for example, by refluxing a solution of the reactants for the requisite time. The resulting complex may be readily recovered from the reaction mixture by conventional techniques, e.g., filtration. Where necessary to satisfy the coordination number of the metal employed, a ligand providing the requisite number of coordinating atoms, i.e., a uni-dentate or multi-dentate ligand, will be required to form the 1:1 complex, as will be appreciated. Useful ligands may be selected from those heretofore employed for such purposes, e.g., pyridine, diethylene triamine, etc. Useful ligands are described, for example, in *Instability Constants of Complex Compounds*, Yatsimirskii and Vasilev, Pergamon Press Inc., 1960

The particular reaction conditions in the foregoing reactions will be readily apparent to those skilled in the art and per see comprise no part of the present invention.

The following examples show by way of illustration and not by way of limitation the preparation of the novel dyes and dye complexes of this invention.

EXAMPLE 1

To a well-stirred solution of 33.6 g. (0.84 mole) of sodium hydroxide in 302 g. of water and 154 g. of ethanol was added 100 g. (0.66 mole) of 2-methoxyacetophenone under a nitrogen atmosphere at 15°C. Seventy-five grams (0.66 mole) of benzaldehyde was added to the mixture, after which it was stirred at room temperature for 12 hours in an inert atmosphere. At the end of such time, the mixture was extracted with three 200-ml. portions of ether. The combined ether extracts were washed with two 100-ml. portions of water, dried over anhydrous magnesium sulfate, and concentrated by flash evaporation. Subsequent distillation of the residual liquid in vacuo afforded 108.3 g. (68.8%) of 2-methoxy chalcone, b.p. 144°-6° C/0.04 mm. (m.p. 38°-9° C) (Found: C, 81.29; H, 6.14, $C_{16}H_{14}O$ requires C, 80.60; H, 5.98) To a mixture of 108.3 g. (0.45 mole) of 2-methoxychalcone (prepared as above) and 30.8 g. (0.42 mole) of nitromethane in 566 ml. of anhydrous methanol was added a methanolic solution of sodium methoxide, prepared from 11.5 g. of sodium and 142 ml. of anhydrous methanol, over a period of 40 minutes under a nitrogen atmosphere at a temperature of about 38° C. The mixture was stirred at room temperature for the next 2 hours, after which it was neutralized with glacial acetic acaid and then chilled overnight. The off-white solid was removed by suction filtration and recrystallized once from ethanol. There was obtained 90.5 g. (66.2%) of $\gamma$-nitro-$\beta$-phenyl-2-methoxybutyrophenone, m.p. 91°-2° C. (Found: C, 68.20; H, 5.87; N, 4.81 $C_{17}H_{17}NO_4$ requires C, 68.30; H, 5.70; N, 4.68.) 140 grams (0.47 mole) of $\gamma$-nitro-$\beta$-phenyl-2-methoxybutyrophenone (prepared as above) and Raney nickel, in 500 ml. of ethyl acetate was allowed to absorb hydrogen in a Parr shaker at room temperature until the theoretical uptake had been reached. The catalyst was removed by filtration and washed with small portions of ethyl acetate. The solvent was removed by flash evaporation and the residual oil was completely dehydrated on a steam cone at reduced pressure overnight. The resulting brown oil and 50 g. of 30 percent palladium or carbon was refluxed with 1.5 l. of p-cymene for 24 hours. The catalyst was removed by filtration and washed with small portions of p-cymene. The combined filtrate and washings was concentrated to 200 ml. during which time the crude product separated. One recrystallization of this crude product from ligroine, b.p. 90°-120° C., afforded 47 g. (40% of 2-o-anisyl-4-phenylpyrrole, m.p. 105°-6° C. (Found: C, 8.05; H, 5.96; N, 5.66. $C_{17}H_{15}NO$ requires C, 81,861 H, 6.08; N, 5.63.) U.V. $\lambda_{max}^{MeOH}$ 241 ($\epsilon$22,800) $\lambda_{max}^{MeOH}$ 316 ($\epsilon$15,200). To a solution of 47.0 g. (0.19 mole) of 2-o-anisyl-4-phenylpyrrole in 450 ml. of anhydrous methylene chloride was added 148 g. (0.59 mole) of boron tribromide with stirring over a period of 1 hour. Stirring at room temperature was continued for an additional 6 hours. At the end of this time, 90 ml. of methanol and 216 ml. of 10 percent hydrochloric acid was added dropwise in succession to the reaction mixture. The methylene chloride layer was separated, washed thoroughly with water, and then dried over anhydrous magnesium sulfate. The solvent was removed by flash evaporation and the residue was purified by boiling its methanolic solution with Norit A. Subsequent removal of methanol by slow evaporation and extraction of the residue with boiling ligroine, b.p. 90°-120°C., gave 21.0 g. (47%) of 2-o-hydroxyphenyl-4-phenylpyrrole, m.p. 127.5°-129° C. (Found: C, 82.12; H, 6.20; N, 5.80. $C_{16}H_{13}NO$ requires C. 81.60; H, 5.68; N, 5.96.) U.V. $\lambda_{max}^{MeCell*}$ 242 m$\mu$ ($\epsilon$22,000);

$\lambda_{max}^{MeCell*}$ 278 mµ (ε14,800) $\lambda_{max}^{MeCell*}$ 318 mµ (ε18,200). A mixture of 5.0 g. (21.0 mM) of 2-o-hydroxyphenyl-4-phenylpyrrole and 5.0 g. (20.0mM) of 2,4-diphenyl-5-formylpyrrole in 300 ml. of anhydrous methanol was treated with short bursts of dry hydrogen chloride at about 25° C. until no further precipitation of the green solid was observed. The reaction mixture was stirred for an additional 3 hours and then chilled. The crude dye mixture was removed by suction filtration, washed with small portions of cold methanol, and then ether. There was obtained 10.0 g. of crude dye, m.p. 211°–214° C. Ten grams of the dye mixture in 1.3 l. of methylene chloride was treated with 50 ml. of triethylamine. The resulting solution was chromatographed on 4.8 × 40 cm. column of Woelm neutral alumina. Continuous elution of the column with methylene chloride gave the first fraction, which yielded 1.30 g. (13.8%) of 3,3',5,5'-tetraphenyldipyrrylmethene, m.p. 284°–286° C. Mixed melting point with an authentic sample showed no appreciable depression. The chromatogram was extruded and then extracted with methanol-methylene chloride (1:20) until most of the dye base had been removed. The extract was evaporated to dryness in vacuo. Two recrystallizations of the residue from nitrobenzene afforded 6.0 g. (68%) of 3',-3,5'-triphenyl-5-o-hydroxyphenyldipyrrylmethene, the compound of formula 1, m.p. 260°–1° C. $\lambda_{max}^{MeCell}$ 542 mµ; ε=44,000 C=1.8 × 10⁻⁵ M (Found: C, 85.75; H, 5.12; N, 6.16; O, 3.45 $C_{33}H_{24}N_2O$ requires C, 85.40; H, 5.20; N, 6.03; O, 3.45.) [* An abbreviation for methyl cellosolve, i.e., β-methoxyethanol.]

EXAMPLE 2

3,3'-Diphenyl-5,5'-di-(o-hydroxyphenyl)dipyrrulmethene (III). A mixture of 5.0 g. (21.0 mM) of 2-o-hydroxyphenyl-4-phenylpyrrole, 40 ml. of formic acid (97%–100%), and 10 ml. of hydrochloric acid (sp. gr. 1.19) was refluxed for 12 hours, after which it was chilled. The crude product was removd by suction filtration, washed with ether, and then boiled with 200 ml. of methanol containing 5 ml. of triethylamine for 15 minutes. The crude dye base, which separated on cooling, was recrystallized twice from pyridine-methanol (1:4). There was obtained 4.5 g. (88%) of 3,-3'-diphenyl-5,5'-di-(o-hydroxyphenyl) dipyrrylmethene, the dye of formula 2, m.p. 268°–9° C. $\lambda_{max}^{MeCell}$ 556; ε=47,800 C=1.8 × 10⁻⁵M (Found: C, 82.85; H, 5.07; N, 5.71; O, 6.62. $C_{33}H_{24}N_2O_2$ requires C, 82.50, H, 5.04; N, 5.83; O, 6.66.)

EXAMPLE 3

To a well-stirred solution of 100 g. (0.67 mole) of 2-methoxyacetophenone and 40 g. (0.91 mole) of acetaldehyde in 200 ml. of anhydrous methanol was added 64 ml. of methanolic sodium methoxide, prepared from 3.2 g. of sodium metal and 64 ml. of anhydrous methanol, at about − 10° C. over a period of 1 hour. After addition was complete, the mixture was stirred at 5°–10° C. for the next 20 hours. At the end of this time, glacial acetic acid was added dropwise until the solution was neutral. The solvent was removed by distillation and the residual liquid was diluted with 250 ml. of water and then extracted with three 150-ml. portions of ether. The combined ether extracts were dried over anhydrous magnesium sulfate and concentrated on a flash evaporator until the solvent had been removed. Subsequent distillation of the residual oil in vacuo gave 27.6 g. of a pale yellow oil, b.p. 138°–140° C/mm. Assay by vapor phase chromatography showed the oil contained 42.2% of 3-(o-anisyl)-propene-2 and 47.0% of β-methoxy-o-methoxybutyrophenone. Twenty-seven grams of the foregoing mixture and 0.3 g. of freshly fused, finely pulverized zinc chloride were heated at an oil bath temperature of 150°–160° C. and an internal pressure of 100 mm. until all the methanol had been eliminated. The residual mixture was cooled to room temperature, acidified with 50 ml. of 3% acetic acid, and then extracted with two 100-ml. portions of ether. The combined ether extracts were washed with water, dried over anhydrous magnesium sulfate, and concentrated on a flash evaporator. Subsequent distillation of the residual oil in vacuo gave 10.3 g. of 3-(o-anisyl)-propene-2, b.p. 87°–9° C./0.05 mm. Assay by vapor phase chromatography showed the distillate was 96% pure. To a well-stirred mixture of 5.3 g. (0.03 mole) of 3-(o-anisyl)-propene-2 (prepared as above and 1.8 g. (0.03 mole) of glacial acetic acid in 40 ml. of ethanol was added 3.9 g. (0.06 mole) of potassium cyanide in 10 ml. of water over a period of 10 minutes at 35°–40° C. After addition was complete, the reaction mixture was stirred at this same temperature for an additional 3 hours. The mixture was chilled and the crude product was removed by suction filtration and washed with water. One recrystallization from ethanol gave 3.0 g. (49.3%) of β-cyano-o- methoxybutyrophenone, m.p. 63°–4° C. Found: C, 70.85; H, 6.40; N, 6.96; O, 15.81. $C_{12}H_{13}NO_2$ requires C, 70.90; H, 6.45; N, 6.90; O, 15.80. 47 grams (0.23 mole) of β-cyano-o-methoxybutyrophenone and Raney nickel in 200 ml. of ethyl acetate was allowed to absorb hydrogen in a Parr shaker at room temperature until the theoretical hydrogen uptake had been reached. The catalyst was removed by filtration and washed with small portions of ethyl acetate. The solvent was removed by flash evaporation and the residual oil was completely dehydrated on a steam cone at reduced pressure overnight. There was obtained 35.0 g. of an isomeric mixture of crude pyrroline. The foregoing mixture (35.0 g.) and 8.0 g. of 30% palladium on carbon in 200 ml. of p-cymene was refluxed for 2 hours under a nitrogen atmosphere, after which the catalyst was removed by filtration and washed with small portions of p-cymene. The solvent was removed by flash distillation and the residual liquid was distilled in vacuo. There was obtained 13.7 g. (31.8%) of 2-o-anisoyl-4-methylpyrrole, b.p. 105°–7° C./0.05 mm. Found: C, 76.85; H, 6.83; N, 7.43; O, 8.36. $C_{12}H_{13}NO$ requies C, 76.95; H, 7.00; N, 7.48; O, 8.55. UV : $\lambda_{max}^{MeOH}$ 289 mµ (ε13,000); $\lambda_{max}^{MeOH}$ 310 mµ (ε14,000). To a well-stirred solution of 14.0 g. (0.075 mole) of 2-o-anixoyl-4-methylpyrrole in 150 ml. of dry methylene chloride was added 45.2 g. (0.18 mole) of boron tribromide over a period of 40 minutes. After addition was complete the mixture was stirred at room temperature for 6 hours. At the end of this time, 50 ml. of methanol and 100 ml. of 10 percent hydrochloric acid was added in succession. The reaction mixture was stirred at room temperature for 1 hour, after which it was extracted with four 75-ml. portions of methylene chloride. The combined extracts were washed thoroughly with water, dried over anhydrous magnesium sulfate, and evaporated to dryness in a flash evaporator. Subsequent recrystallization from ligroine (b.p. 90°–120° C.) and decolorization with Norit gave 3.3 g. (25.4%) of 2-o-hydroxyphenyl-4-methylpyrrole, m.p. 83°–4° C. Found: C, 76.25; H, 6.34; N, 8.05; O, 9.45. $C_{11}H_{11}NO$ requires C, 76.25; H, 6.43; N, 8.08; O, 9.25 UV: $\lambda_{max}^{MeOH}$ 285 m$\mu$ ($\epsilon$12,200) $\lambda_{max}^{MeOH}$ 315 m$\mu$ ($\epsilon$12,600). A mixture of 2.6 g. (15.0 mM) of 2-o-hydroxyphenyl-4-methyl-pyrrole and 1.85 g. (15.0 mM) of 2,4-dimethyl-5-formylpyrrole in 60 ml. of anhydrous methanol was treated with short bursts of anhydrous hydrogen chloride at about 25-30° C. until no further precipitation was observed. Subsequent chilling gave the crude dye, which was removed by suction filtration and washed with cold methanol, basified with triethylamine, boiled on a steam bath for 10 minutes and then chilled. One recrystallization of the resulting dye base from methanol-triethylamine gave 3.0 g. (72%) of 5'-o-hydroxyphenyl-3',3,5-trimethyldipyrrylmethene, the compound of formula 3, m.p. 124°–5° C. $\lambda_{max}$ (MeCell) = 490 m$\mu$; $\epsilon$= 42,800; Elemental Analysis: Calc. C, 77.60; H, 6.54; N, 10.08; O, 5.75; Found: C, 77.11; H, 6.73; N, 9.65; O, 5.63.

EXAMPLE 4

A mixture of 0.5 g. (2.9 mM) of 2-o-hydroxyphenyl-4-methylpyrrole, 5.0 ml. of formic acid (99–100%) and 10 drops of hydrochloric acid (sp. gr. 1.19) was refluxed for 1.5 hours, after which it was cooled and stirred with 35 ml. of ether. The precipitate was removed by suction filtration, washed thoroughly with ether and recrystallized once from methanol-triethylamine. There was obtained 0.30 g. (75.0%) of 3,3'-dimethyl-5,5'-di-o-hydroxyphenyl-dipyrrylmethene, the compound of formula 4, m.p. 224°–5° C. $\lambda_{max}$ (MeCell) = 536 m$\mu$; $\epsilon$= 48,300; Elemental Analysis: Calc. C, 77.60; H, 5.68; N, 7.87; O, 8.95; Found: C, 77.68; H, 5.76; N, 7.67; O, 8.86.

EXAMPLE 5

A mixture of 4.7 g. (20.0 mM) of 2-o-hydroxyphenyl-4-phenylpyrrole and 2.46 g. (20.0 mM) of 2,4-dimethyl-5-formylpyrrole in 70 ml. of anhydrous methanol was treated with short bursts of anhydrous hydrogen chloride at about 25–30° C. until no further precipitation was observed. Subsequent chilling gave the crude dye, which was removed by suction filtration and washed with cold methanol. This crude dye was suspended in 70 ml. of methanol, basified with triethylamine, boiled on a steam bath for 10 minutes and then chilled. On recrystallization of the resulting dye base from methanol-triethylamine gave 6.0 g. (88.5%) of 5'-o-hydroxyphenyl-3'-phenyl-3,5-dimethyldipyrrylmethene, the compound of formula 5, m.p. 167°–9° C. $\lambda_{max}$ (MeCell) = 495 m$\mu$; $\epsilon$= 42,800; Elemental Analyses: Calc. C, 81.10; H, 5.94; N, 8.24; O, 4.71; Found: C, 80.40; H, 6.09; N, 8.35; O, 4.98.

EXAMPLE 6

A mixture of 0.50 g., (1.0 mM) of 3,3',5,5'-tetraphenyldipyrrylmethene and 0.30 g. 1.4 mM of zinc acetate dihydrate was refluxed with 25 ml. of n-butanol for one hour, after which it was chilled. The precipitate was removed by suction filtration, washed with small portions of methanol, and recrystallized once from pyridine-methanol. There was obtained 0.50 g. (93%) of the 2:1 zinc complex of 3,3',5,5'-tetraphenyldipyrrylmethene m.p. 293°–4° C. $\lambda_{max}^{MeCell}$ 529 m$\mu$; $\epsilon_{max}^{MeCell}$ 110,000 $C$=1.8 × 10$^{-5}$ M (Found: C, 82.70; H, 4.84; N, 5.96; Zn, 6.77 $C_{66}H_{46}N_4Zn$ requires C, 82.52; H, 4.83; N, 5.83; Zn. 6.81.)

EXAMPLE 7

A mixture of 0.51 g., (1.1 mM) of 5'-o-hydroxyphenyl-3,3',5-triphenyl-dipyrrylmethene, 0.35 g., (2.2 mM), of zinc acetate dihydrate, and 0.67 g. of triethylamine was refluxed with 100 ml. of absolute ethanol for 2 hours, after which it was poured into 150 ml. of cold water with stirring. The residue was removed by suction filtration, washed thoroughly with water, and dried in vacuo over Drierite at 60° C. Purification was accomplished by extracting this residue with absolute ethanol in a Soxhlet extractor for 48 hours. There was obtained 0.41 g. (66%) of the zinc complex of 3,3', 5-triphenyl-5'-o-hydroxyphenyldipyrrylmethene, m.p. 300° C. $\lambda_{max}^{MeCell}$ 593 m$\mu$; $\epsilon_{max}^{MeCell}$ 74,000 $C$=1.8 × 10$^{-5}$ M (Found: C, 70.65; H, 4.68; N, 4.83; Zn, 12.93. $C_{33}H_{24}N_2O_2Zn$ $H_2O$ requires C, 70.24; H, 4.66; N, 4.97; Zn, 11.60.)

EXAMPLE 8

A mixture of 0.48 g. (1 mM) of 5,5'-bis(o-hydroxyphenyl)-3,3'-diphenyldipyrrylmethene, 0.24 g. (1.1 mM) of zinc acetate dihydrate, and 0.5 g. (5.0 mM) of triethylamine was refluxed with 50 ml. of absolute ethanol for 1 hour, after which it was poured into 100 ml. of cold water with stirring. The residue was removed by suction filtration, washed thoroughly with water, and dried in vacuo over Drierite at 60° C. Purification was accomplished by extracting this residue with absolute ethanol in a Soxhlet extractor for 24 hours. There was obtained 0.36 g. (62.4%) of the zinc complex of 3,3'-diphenyl-5,5-bis(o-hydroxyphenyl)dipyrrylmethene, m.p. 300° C. $\lambda_{max}^{MeCell}$ 613; 575 m$\mu$; $\epsilon_{max}^{MeCell}$ 60,000; 24,000 $C$=1.8 × 10$^{-5}$M (Found: C, 67.57; H, 5.63; N, 4.75; Zn, 10.97. $C_{33}H_{21}N_2O_2Zn$ $(H_3O)^+$.-$H_2O$ requires C, 68.30; H, 4.55; N, 4.83; Zn, 11.25.)

EXAMPLE 9

A mixture of 0.48 g. (1 mM) of 5,5'-bis (o-hydroxyphenyl)-3,3'-diphenyldipyrromethene, 0.25 g. (1 mM + 10% excess) of cobalt acetate tetrahydrate, and 1.0 g. (12.7 mM) of pyridine in 50 ml. of absolute ethanol was refluxed for 1 hour, after which it was cooled and diluted with 150 ml. of water. The green precipitate was removed by suction filtration, washed thoroughly with water, dired in vacuo at 60° C. over Drierite, and then extracted with absolute ethanol. One recrystallization of the ethanol insoluble material from pyridine ethanol (1:4) afforded 0.40 g. (58%) of the cobalt complex of 5,5'-bis(o-hydroxyphenyl)-3,3'-diphenyldipyrrylmethene, m.p. >300° C. Anal. Calcd. for $C_{43}H_{31}N_4O_2Co$: C, 74.30; H, 4.52; N, 8.07; Co, 8.48; Found: C, 74.21; H, 4.76; N, 8.03; Co, 8.55; $\lambda_{max}^{MeCell}$ 665 m$\mu$; $\epsilon_{max}^{MeCell}$ 25,500.

EXAMPLE 10

The copper complex of 5,5'-bis(o-hydroxyphenyl)-3,3'-diphenylpyrrylmethene was prepared by substituting copper acetate for the cobalt acetate in Example 6. Yield: 15.6%; m.p. >300° C. Anal. Calcd. for $[C_{33}H_{21}N_2O_2Cu^-H^+]$ 0.2$C_2H_5OH$: C, 70.30; H, 5.40; N 4.43; Cu, 10.02; Found: C, 71.06; H, 4.24; N, 4.80; Cu, 9.74; $\lambda_{max}^{MeCell}$ 651 m$\mu\epsilon_{max}^{MeCell}$ 37,500.

EXAMPLE 11

The nickel complex of 5,5'-bis(o-hydroxyphenyl)-3,3'-diphenyldipyrrylmethene was prepared in the same manner. Yield: 32.2%; m.p. >300° C. Anal. Calcd. for $[C_{33}H_{21}N_2O_2Ni^- H_3O^+]$ 0.2$H_2O$: C, 66.90; H, 4.09; N, 5.73; Ni, 9.94; Found: C, 66.85; H, 4.10; N, 5.20; Ni, 9.94; $\lambda_{max}^{MeCell}$ 680 m$\mu$; $\epsilon_{max}^{MeCell}$ 23,300.

EXAMPLE 12

A mixture of 0.51 g. (1.1 mM) of 5-o-hydroxyphenyl-3,3',5'-triphenyldipyrrylmethene and 0.5 g. (2.0 mM) of nickel acetate tetrahydrate in 50 ml. of dimethylformamide was refluxed for 1 hour, after which it was cooled and diluted with 150 ml. of ice water. The precipitate was removed by suction filtration, washed thoroughly with water, and dried in vacuo over Drierite at 60° C. One purification by dissolution in dimethylformamide and and reprecipitation with water afforded 0.56 g. (94.5%) of the nickel complex of 5-o-hydroxyphenyl-3,3',5'-triphenyldipyrrylmethene, m.p. >300° C. Anal. Calcd. for $C_{36}H_{29}N_3O_2Ni$: C, 72.70; H, 4.94; N, 7.07; Ni, 9.90; Found: C, 73.01; H, 4.84; N, 6.86; Ni, 9.82; $\lambda_{max}^{DMF}$ 544 ($\epsilon$max 16,200); 613 (19,000); 718 (13,200).

EXAMPLE 13

A mixture of 0.42 g. (1.5 mM) of 5'-o-hydroxyphenyl-3',3,53,5-trimethyldipyrrylmethene, 0.33 g. (1.5 mM + 10% excess) of copper acetate monohydrate, and 0.35 g. of pyridine in 50 ml. of ethanol was refluxed for 30 minutes, after which it was poured into 100 ml. of ice water. The crude complex was removed by suction filtration and washed thoroughly with water. One recrystallization from pyridineethanol gave 0.39 g. (62.3%) of the copper complex of 5'-o-hydroxyphenyl-3',3,5-trimethyldipyrrylmethene, m.p. 249°-250° C.

EXAMPLE 14

In a similar manner, using pyridine as ligand, the copper complex of 5'-o-hydroxyphenyl-3'-phenyl-3,5-dimethylpyrrylmethane was prepared in 54% yield, m.p. >300° C., $\lambda_{max}$ (MeCell) = 559 m$\mu$; $\epsilon$ = 53,900.

EXAMPLE 15

Using p-benzylpyridine as ligand, the nickel complex of o-hydroxyphenyl-3'-phenyl-3,5-dimethylpyrrylmethene was prepared in 44.8% yield, m.p. 278°-280° C., $\lambda_{max}$ (MeCell) = 548 m$\mu$; $\epsilon$= 54,500.

EXAMPLE 16

Using p-benzylpyridine as ligand, the zinc complex of the above dye (formula 5) was prepared in 75.6 yield, m.p. 288°-289.5° C., $\mu_{max}$ (MeCell) 550 m$\mu$; $\epsilon$= 39,400; m$\mu\mu$ $\epsilon$ = 39,400.

EXAMPLE 17

Using pyridine as ligand, the cobalt complex of the above dye was obtained, m.p. 286°-290° C., $\lambda_{max}$ (MeCell) = 540 m$\mu$; $\epsilon$ = 17,800.

Elemental analyses of all of the metal complexes prepared in the illustrative examples confirmed that they were all 1:1 complexes, except for the prior art 2:1 complex prepared in Example 6.

The novel dyes of this invention are fugitive, not being stable to light in their non-complexed form for any appreciable period of time. However, the metal complexes of these dyes are of good light and chemical stability. The transition metal complexes are appreciably more stable than the non-transition metal complexes and hence are preferred.

The spectral absorption curves of these dyes show that they as a class possess sharp peaks and narrow bands. Stated another way, these dyes provide maximum absorption over a narrow region of the visible spectrum and minimal absorption elsewhere over regions of the spectrum which in practical use would be regarded as unwanted absorption.

Other known dyes, e.g., the cyanine dyes, possess similar spectral absorption characteristics, but are also characteristically both fugitive and incapable of existing in a form possessing adequate stability. Hence, the present dyes are markedly superior in that they are both stable in complexed form and possess brilliant spectral absorption characteristics.

The spectral absorption curves of: (1) an illustrative dye of this invention, the copper-pyridine complex of the dye of formula 3; (2) a standard control magenta dye, 2-[p-(2',5'-dihydroxyphenethyl)-phenylazo]-4-isopropoxy-1-naphthol; and (3) a chromium-complexed dye, Inochrome Pink N, have been superposed in the graph of the drawing to illustrate the superior spectral absorption characteristics of the dyes of this invention over representative useful dyes heretofore employed in the art, the numerals on the drawing corresponding to those recited above. Note the sharp peak and narrow band of the claimed dyes.

The spectral absorption curves were obtained by swabbing a solution of the dye onto a dyeable stratum such as would be employed in preparing a photographic dye image. Reflectance curves were then run with standard apparatus for this purpose.

The ratio of the maximum absorption ($D_{max}$) at the peak of the curve to the minimum absorption ($D_{min}$) at a fixed point, 450 m$\mu$ was calculated for each of the dyes, a conventional means of analyzing and comparing the brilliance and quality of magenta dyes. The band width midway between the $D_{max}$ and $D_{min}$ (half-band width) of the dyes were also calculated further to compare the brilliance and sharp peaks of the dyes. This data is set forth below:

|    |                  | $\frac{D_{max}}{D_{min}}$ | Half-Band Width |
|----|------------------|---------------------------|-----------------|
| 1. | Formula 3        | 7.3                       | 518 to 584 = 66 |
| 2. | Control Magenta  | 3.1                       | 460 to 595 = 135 |
| 3. | Inochrome Pink N | $D_{max}$ 3.3             | Half-Band Width 473 to 590 = 117 |

The stability of each of the three dyes to the degradative effects of light was evaluated in conventional manner by subjecting the respective strata containing them to tests under a Xenon arc at 128° F. and 31% relative humidity. After eight hours the dye of formula 3 had only faded 8% while the control magenta had faded 39%, as calculated by comparing the $D_{max}$ at the beginning of the test to the $D_{max}$ after 8 hours. The chromium complex, Inochrome Pink N exhibited greater stability, but as noted above, did not possess as good a spectral absorption curve.

By way of recapitulation, dyes are known which have greater stability than the claimed metal complexes. Dyes are also known, e.g., the cyanine dyes, which possess a brilliance and spectral absorption characteristics comparable to the claimed dyes. The remarkable thing about the claimed dyes is thus not each individual trait alone, but the combination of both. Typically, the narrow band, sharp peak brilliant dyes are fugitive or unstable and are not capable of existing in a form possessing stability adequate for most purposes, e.g., by complexing; whereas dyes of sufficient stability for the contemplated use, e.g., in color photography, do not possess as fine spectral absorption curves.

The essence of the present invention, therefore, is providing a novel class of dyes which combine both of these qualities and qualifications.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A pyrrole of the formula:

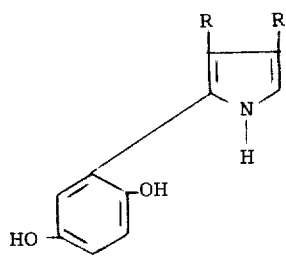

where: one R is hydrogen and the other is a substituent chosen from the group consisting of methyl, ethyl, phenyl or 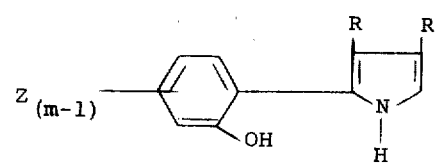

each Z is hydroxy, methyl or methoxy and
$m$ is a positive integer from 1–3.

2. A pyrrole of the formula:

where: one R is hydrogen while the other is a substituent chosen from the group consisting of methyl, ethyl, phenyl or 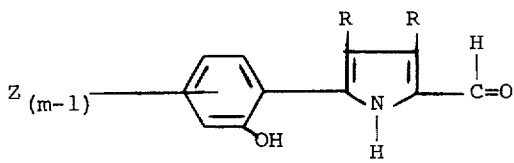

each Z is hydroxy, methyl or methoxy and
$m$ is a positive integer 1 to 3.

3. A pyrrole of the formula:

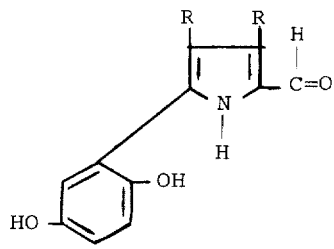

where: one R is hydrogen while the other is a substituent chosen from the group consisting of methyl, ethyl, phenyl or each Z is hydroxy, methyl or methoxy and
$m$ is a positive integer from 1 to 3.

4. A pyrrole of the formula where: one R is hydrogen and the other is a substituent chosen from the group consisting of methyl, ethyl, phenyl or each Z is hydroxy, methyl or methoxy and
$m$ is a positive integer from 1 to 3.

* * * * *